(12) United States Patent
Schuetzle et al.

(10) Patent No.: US 9,896,626 B1
(45) Date of Patent: Feb. 20, 2018

(54) APPARATUS AND PROCESS FOR EFFICIENT PRODUCTION OF LIQUID FUELS FROM GASEOUS HYDROCARBONS

(71) Applicant: Greyrock Energy, Inc., Sacramento, CA (US)

(72) Inventors: Robert Schuetzle, Sacramento, CA (US); Dennis Schuetzle, Grass Valley, CA (US)

(73) Assignee: Greyrock Technology LLC, Sacramento, CA (US)

( * ) Notice: Subject to any disclaimer, the term of this patent is extended or adjusted under 35 U.S.C. 154(b) by 0 days.

(21) Appl. No.: 14/544,339

(22) Filed: Dec. 26, 2014

(51) Int. Cl.
| | | |
|---|---|---|
| *C10G 2/00* | (2006.01) | |
| *C10L 1/04* | (2006.01) | |
| *B01J 19/24* | (2006.01) | |
| *C01B 3/36* | (2006.01) | |

(52) U.S. Cl.
CPC .............. *C10G 2/34* (2013.01); *B01J 19/245* (2013.01); *C01B 3/36* (2013.01); *C10G 2/32* (2013.01); *C10L 1/04* (2013.01); *B01J 2219/24* (2013.01); *C01B 2203/0255* (2013.01); *C01B 2203/062* (2013.01); *C01B 2203/1241* (2013.01); *C01B 2203/1258* (2013.01); *C01B 2203/1276* (2013.01); *C10L 2290/42* (2013.01)

(58) Field of Classification Search
CPC .... C10G 2/34; C10G 2/32; C10L 1/04; C10L 2290/42; C01B 3/36; C01B 2203/062; C01B 2203/1258; C01B 2203/1241; C01B 2203/0255; C01B 2203/1276; B01J 19/245; B01J 2219/24
See application file for complete search history.

(56) References Cited

U.S. PATENT DOCUMENTS

| | | | |
|---|---|---|---|
| 4,499,209 A | 2/1985 | Hoek et al. | |
| 5,620,670 A | 4/1997 | Benham et al. | |
| 5,628,931 A | 5/1997 | Lednor et al. | |
| 6,114,400 A * | 9/2000 | Nataraj | C01B 3/36 |
| | | | 252/373 |
| 6,214,757 B1 * | 4/2001 | Schwartz | B01D 53/228 |
| | | | 210/500.25 |
| 6,262,131 B1 | 7/2001 | Arcuri et al. | |
| 6,444,179 B1 | 9/2002 | Sederquist | |
| 6,693,138 B2 | 2/2004 | O'Rear | |

(Continued)

*Primary Examiner* — Rosalynd A Keys
*Assistant Examiner* — Amy C Bonaparte
(74) *Attorney, Agent, or Firm* — Jeffrey A. McKinney; McKinney Law Group APC

(57) ABSTRACT

An apparatus for a distributed manufacturing plant that allows direct, economical production of transportation fuels and/or chemicals at remote sites is described. The production plant employs two primary integrated systems consisting of a syngas generator and a catalytic process that are used to directly produce fuels and chemicals. The syngas generator utilizes oxygen anions, produced from a ceramic membrane system, to generate high quality syngas directly at pressures of about 100-600 psia. The tail gas and water containing hydroxyl-alkanes from the catalytic process are recycled into the syngas generator, in automatically controlled proportions, to regulate the hydrogen to carbon monoxide within the preferred $H_2/CO$ stoichiometric range of about 1.8-2.4. The primary products produced directly from the plant include reformulated gasoline blendstocks, #1 diesel fuels, and #2 diesel fuels.

11 Claims, 2 Drawing Sheets

(56) References Cited

U.S. PATENT DOCUMENTS

| | | |
|---|---|---|
| 6,942,839 B2 | 9/2005 | Huisman et al. |
| 7,261,751 B2 | 8/2007 | Dutta et al. |
| 7,404,936 B2 * | 7/2008 | Mazanec ............... B01J 19/0093 422/198 |
| 7,910,629 B2 | 3/2011 | Minta et al. |
| 2001/0002990 A1 * | 6/2001 | MacKay ............... B01D 53/228 423/594.1 |
| 2009/0111900 A1 * | 4/2009 | Ayasse ................. B01J 23/8896 518/715 |
| 2009/0124713 A1 * | 5/2009 | Ayasse ................. B01J 23/8896 518/715 |

* cited by examiner

APPARATUS AND PROCESS FOR EFFICIENT PRODUCTION OF LIQUID FUELS FROM GASEOUS HYDROCARBONS

The present invention is generally directed to apparatuses and methods for the conversion of gaseous hydrocarbons to liquid fuel.

BACKGROUND OF THE INVENTION

Natural gas is an important, global energy and chemical feedstock resource. The term 'natural gas' does not specify a uniform substance, but rather is a phrase used to distinguish primarily gaseous hydrocarbon fuels. Different sources have different concentrations of $CH_4$, gas phase hydrocarbons ($C_2$-$C_5$), condensate ($C_5$+ hydrocarbons), inert gases ($CO_2$, $N_2$, Ar), and contaminants such as $H_2S$.

Geography, at least in part, determines the composition of the natural gas resource. Table 1 summarizes some of the differences (Bakar and Ali, 2012 for wells outside of the U.S.; Environment and Energy News, 2012 for N. Dakota Bakken wells, and U.S. Geological Survey, 2013 for New Mexico). These dissimilarities pose a problem, as any distributed (on-site) production of liquid fuels from these sources must be extremely flexible and capable of internal processing adjustment to meet the differing compositions presented.

TABLE 1

The Variation in Constituents Typically Found in Gaseous Hydrocarbon Resources

| Constituent | U.S. (North Dakota) | U.S. (New Mexico) | Netherlands | France | Paikistan | Saudi Arabia | Indonesia |
|---|---|---|---|---|---|---|---|
| | | | Concentration (%)[1] | | | | |
| Methane | 59.3 | 74-95 | 81 | 69 | 27 | 56 | 66 |
| Ethane | 17.7 | 0-10 | 2.9 | 3.0 | 0.7 | 18 | 8.5 |
| Propane | 9.4 | 0-5 | 0.4 | 0.9 | 0.3 | 9.8 | 14.5 |
| Butane | 2.7 | 0-3 | 0.1 | 0.5 | 0.3 | 4.5 | 5.1 |
| Pentane+ | 0.92 | 0-0.5 | 0.1 | 0.5 | nd | 1.6 | 0.8 |
| Carbon Dioxide | 0.51 | 0-10 | 0.9 | 9.3 | 46.2 | 8.9 | 4.1 |
| Oxygen | nd | 0-0.2 | nd | nd | nd | nd | nd |
| Nitrogen | 7.1 | 0-3 | 14.3 | 1.5 | 25.2 | 0.2 | 1.3 |
| Hydrogen | nd | 0-1 | nd | nd | nd | nd | nd |
| Rare Gases | nd | 0-1 | nd | nd | nd | nd | nd |

[1]nd: not determined

Forty to sixty percent of the world's proven gas reserves are stranded (PetroWiki, 2014). They are stranded for one or more of the following reasons:
1. The reserve is too remote from the market for natural gas and natural gas liquids (NGL's), making construction of a major pipeline prohibitively expensive.
2. The reserve is in a region where the demand for gas is saturated, and the cost of exporting gas beyond its production region is excessive.
3. The reserve has a limited production lifetime.
4. In addition to $CH_4$, the resource contains significant concentrations of other gas-phase $C_2$-$C_4$ hydrocarbons, $C_5$+ hydrocarbons (NGLs), inert gases and/or contaminants that make the resource unsuitable for introduction into a gas pipeline. The natural gas received and transported by the major intrastate and interstate mainline transmission systems must meet the quality standards specified by pipeline companies in the "General Terms and Conditions (GTC)" section of their tariffs. These quality standards vary from pipeline to pipeline and are usually a function of a pipeline system's design, its downstream interconnecting pipelines, and its customer base.
5. The current market for NGLs is poor due to overabundance in many regions (Cantrell et al, October 2013).
6. Gas can be an uneconomical by-product of oil production. Since it is not cost-effective to utilize this natural gas due to low gas volumes (typically about 0.1-5.0 million scf/day/well) and since this resource usually declines in volume in a few years, this associated gas is normally flared (burned) during the oil production process (PetroWiki, 2014). This flaring wastes a potentially valuable resource and produces high levels of greenhouse and criteria pollutant emissions. For example, in North Dakota during July 2014, over 12,000,000 Mcf of natural gas was flared representing about one third of the total gas production in the state (reference: North Dakota State Government, "North Dakota Drilling and Production Statistics" (2014).

The issues above have led to the development of distributed gas-to-liquids (GTL) processes (Sousa-Aquiar et al., 2011). The liquid hydrocarbon products produced from the GTL process can then be economically transported to customers using the existing, liquid fuel transport infrastructure.

The selection of technologies for the distributed conversion of gaseous hydrocarbon resources to fuels is not straightforward, especially in view of the fact that the conversion processes may need to be operated at remote locations and/or at locations where limited infrastructure is available. Major factors to be considered include the cost, volume, composition and lifetime of the gaseous hydrocarbon resource; the compactness and complexity of the conversion process; plant capital and operational and maintenance (O&M) requirements; the ability to move all of the major unit processes to the distributed site using truck transport on the available road infrastructure; the energy efficiency of the plant; air emissions and water effluents; safety; product off-take; and other factors.

To date, the conversion of gaseous hydrocarbon resources into more valuable liquid hydrocarbon products has been comprised of four main unit processes: 1) oxygen generation 2) syngas generation; 3) catalytic conversion of the syngas to intermediate products (primarily wax) and; 4) wax upgrading/refining processes such as hydrocracking and other upgrading/refining steps (Cantrell et al, 2013).

During the oxygen generation step, oxygen is produced from air and is used as an input to the syngas generation process. Several commercial methods can be used for oxygen generation including cryogenic oxygen production plants, pressure swing absorption (PSA) methods, vacuum pressure swing absorption (VPSA) methods, ceramic or other types of membranes, and other oxygen generation technologies. Each of these methods requires substantial capital to deploy. The oxygen is delivered to the syngas unit at different levels of purity depending on the oxygen generation process used. For example, use of a VPSA method will result in 90-93% oxygen with the balance of Argon and Nitrogen. These impurities are sent into the syngas generation plant and then follow through to the other unit processes, reducing efficiency and resulting in higher capital costs to accommodate these gas volumes. One additional challenge of the current technologies for oxygen generation is the requirement for compression of the oxygen, requiring compression capital and operating expense (energy) to compress the oxygen gas up to plant pressure for input into the system.

Since the 1930's, syngas has been used as an important feedstock for producing fuels and chemical products (Arsalanfar, M. et al, 2014). For the efficient production of fuels or chemicals, $H_2/CO$ should ideally be within the stoichiometric ratio of about 1.8-2.4/1.0.

Syngas production can use a variety of methods but the most efficient are the ones that use oxygen as an input (oxidant) to the system. Technologies include partial oxidation (PDX) and auto-thermal reforming (ATR).

Partial oxidation (PDX) is carried out with sub-stoichiometric gaseous hydrocarbon/oxygen mixtures in reformers at temperatures in the 1,500-2,700° F. range. Praxair, Shell, ConocoPhillips and others have developed systems for the conversion of gaseous hydrocarbon resources into syngas using PDX. Each of these systems uses an oxygen input, requiring pressurized oxygen to be delivered to the plant using one of the methods described above. The Praxair process as an example utilizes a hot oxygen burner that is non-catalytic and converts natural gas (or other hydrocarbons) and oxygen into syngas as described in U.S. Patent application US2012/037562. ConocoPhillips uses a catalyst in their system as described in U.S. Pat. No. 7,261,751. In commercial practice, some quantity of steam may be added to the PDX reformer in order to minimize elemental carbon formation and increase the $H_2/CO$ ratio as described in the U.S. Pat. No. 6,942,839 by Shell.

There are some disadvantages with the use of PDX for smaller distributed gas-to-liquids systems: 1) any PDX process requires oxygen making it necessary to co-locate an oxygen production plant next to the distributed GTL plant and, depending upon the oxygen generation method, may contain concentrations of other gases such as nitrogen and argon; 2) additional unit operations are required to increase the $H_2/CO$ to the appropriate stoichiometric ratios of 1.8-2.4 and; 3) nitrogen present in the feedstock or present in the oxygen stream produces $NH_3$ and HCN contaminants in the syngas stream, which are potential catalyst poisons.

Autothermal Reforming (ATR) is another category of technology that utilizes a catalyst to produce syngas from gaseous s hydrocarbons, oxygen, and steam. Shell describes an ATR process in the U.S. patent Ser. No. 08/499,153 and Ballard Power Systems describes an ATR process in U.S. Ser. No. 09/684,170. There are several disadvantages when using ATR in a distributed plant: 1) the catalyst is costly and may have a limited lifetime; 2) the catalytic reformers are large and expensive; 3) an entire co-located oxygen production plant is needed which adds significant capital cost and can more than double the plant energy requirements and; 4) since the $H_2/CO$ ratio is too high, additional unit processes are required for the separation of the hydrogen as required to decrease the $H_2/CO$ to the required stoichiometric ratio.

Following syngas production, the primary catalysts used for conversion of the syngas to intermediate products include Fischer-Tropsch (F-T) catalysts that produce a mix of hydrocarbon products, mostly focused in the wax range (hydrocarbons from approximately $C_{30}$ to $C_{100}$). Many Fischer-Tropsch catalysts and systems are described and are generally known in the art.

For example, U.S. Pat. No. 6,262,131 B1 (Syntroleum), issued Jul. 17, 2001, describes a structured Fischer-Tropsch catalyst system and method that incudes at least one structure having a catalytic surface, such catalytic surface having a linear dimension exceeding 20 mm, a void ratio exceeding 0.6, and a contour that causes non-Taylor flow when CO and $H_2$ pass through the structure. F-T catalysts, including iron and cobalt, are described in the patent.

U.S. Pat. No. 7,404,936 (Velocys, Inc.) issued Jul. 29, 2008, describes a micro-channel reactor system and catalysts used in the micro-channel reactor system to produce heavy hydrocarbons (primarily wax) from a syngas steam.

U.S. Pat. No. 4,499,209 (Shell Oil Company), issued Feb. 12, 1985, describes a Fischer-Tropsch catalyst prepared by impregnation of a silica carrier with a solution of zirconium and titanium, followed by calcination and other preparation steps.

U.S. Pat. No. 5,620,670 (Rentech, Inc.) issued Apr. 15, 1997; describe a catalytic process converting hydrogen and carbon monoxide in a Fischer-Tropsch synthesis reactor using promoted iron oxide catalyst slurry.

These patents describe catalysts that form high molecular weight hydrocarbon reaction products (e.g., wax) that require further processing, including hydro-processing and other upgrading processes, to produce diesel fuel or diesel blendstock.

Hydrocracking and other upgrading processes add significant expense and complexity to a plant design. Such processes can be justified for large, refinery scale plants such as traditional gas to liquids plants. However for smaller, distributed applications that require lower volumes of feedstock for gas-to-liquids (GTL), and other plants that function at smaller scale (generally less than approximately 10,000 barrels per day), plant designs that incorporate traditional F-T processes that include hydrocracking and other expensive upgrading processes may not be economically viable.

There are also well know methods of recycling by-product streams produced from integrated syngas production and Fischer Tropsch systems to achieve higher yields.

Information relevant to the recycling of $CO_2$ during the catalytic conversion of syngas to liquid fuels is available in U.S. Pat. No. 6,693,138 (O'Rear, 2004) and U.S. Pat. No. 7,910,629 (Minta et al, 2011). However, these references require that the $CO_2$ be separated from the tailgas in an expensive and cumbersome process.

Information relevant to the recycling of $C_1$-$C_5$ hydrocarbons may be found in Shah et al, 2003 and Schanke et al, 2004. However, none of the related art uses recycled $C_1$-$C_5$ hydrocarbons to maintain an optimum syngas $H_2/CO$ ratio of 1.8-2.4.

Information relevant to recycling water with $C_1$-$C_5$ alcohols is available in Pruet, 2005. However, this method requires that these organic compounds be removed before the introduction to the syngas generator.

From the discussion above, it is evident that most distributed natural gas production sites cannot be economically served by current technologies.

SUMMARY OF THE INVENTION

The embodiments of the present invention disclose integrated, efficient, low-cost, distributed GTL technologies, suitable for deployment in the field. These embodiments have no need for expensive or cumbersome oxygen generation equipment, making them transportable and affordable for placement in the field for distributed production of liquid fuels. Furthermore, these systems have no need for expensive or cumbersome upgrading/refining processes.

In particular, a preferred embodiment of the present invention provides an apparatus whereby a mixture of gaseous hydrocarbons is economically converted directly into high quality syngas by employing a syngas generator with a ceramic membrane that has been integrated with a direct liquid fuel production reactor. This approach eliminates two of four major unit operations that are currently required for GTL—the oxygen plant and the wax upgrading/refining processes.

In some embodiments, syngas with the ideal stoichiometric $H_2/CO$ ratio of about 1.8-2.4/1.0 is produced by recycling the process water and/or by-product tail gases generated by the direct liquid fuel production reactor to the syngas generator.

This integrated process produces drop-in liquid transportation fuels such as premium diesel fuels and reformulated gasoline blendstocks. In some embodiments of the present invention, high value chemical products, such as alpha-olefins, hydroxy-alkanes, or other specialty performance chemicals may be produced by distillation or other fractionation of the fuel products at the distributed site or at another location.

DETAILED DESCRIPTION OF THE INVENTION

Figure 1:
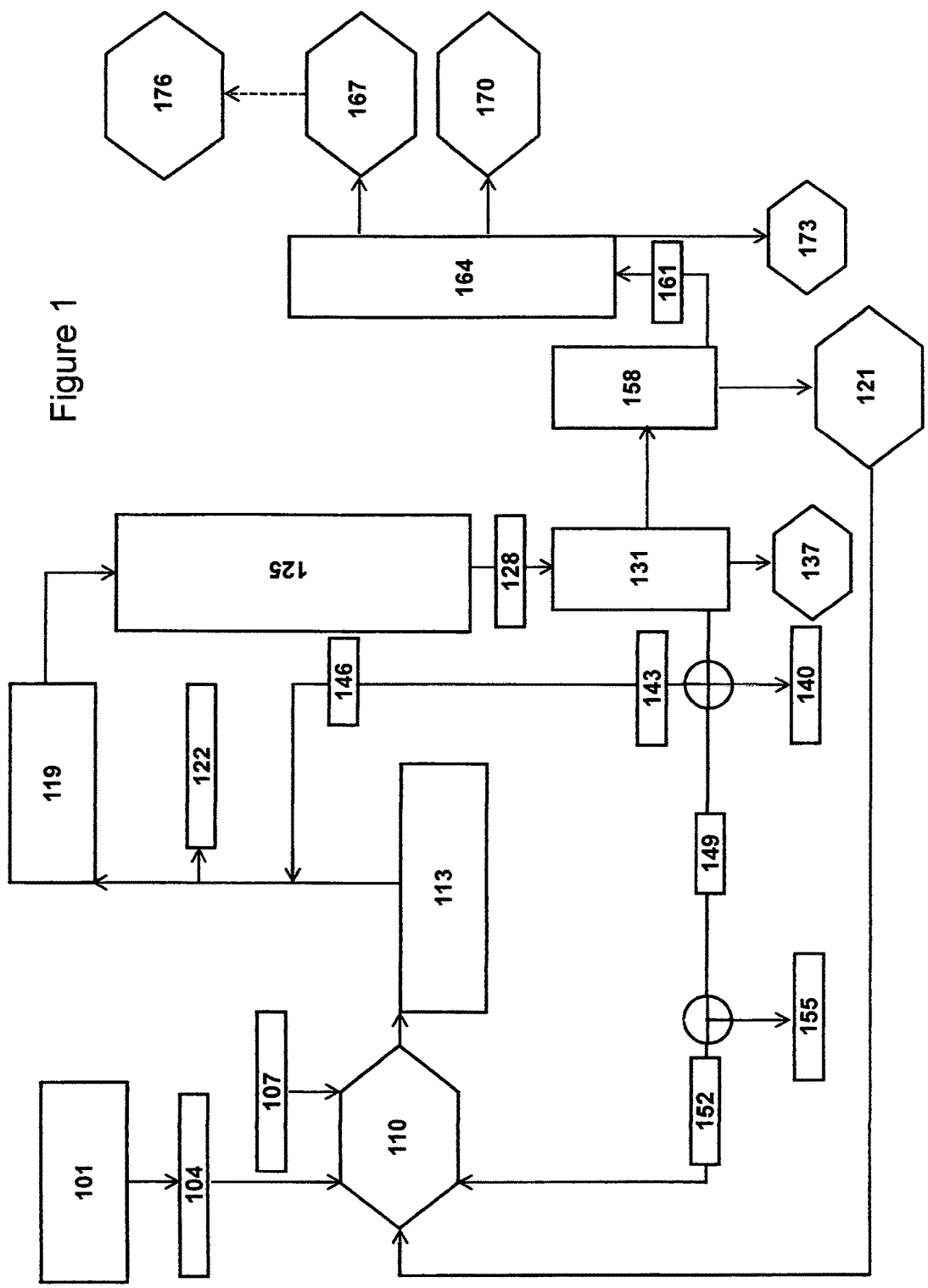
FIG. 1 illustrates a flowchart of a preferred embodiment of the distributed conversion process consisting of the syngas generator and direct liquid fuel production reactor with associated recycle streams.

The present invention describes an economical, distributed production process for the conversion of gaseous hydrocarbon resources directly into liquid fuels as illustrated in FIG. 1. A major advantage of this invention is that only two main unit processes are needed in contrast to the several unit processes that are required in the current art. The elimination of these unnecessary unit processes significantly reduces plant complexity, resulting in significantly lower capital, operating costs, system mobility, and operating simplicity.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The term "comprises" and grammatical equivalents thereof are used herein to mean that other components, ingredients, steps, etc. are optionally present. For example, an output comprising components A, B and C can contain only components A, B and C, or can contain not only components A, B and C but also one or more other components.

FIG. 1 represents the primary flow of processes in a preferred embodiment of the invention. Gaseous hydrocarbons resources are input into the system 101. These resources may be natural gas, bio-gas, associated gas, gas phase hydrocarbons (for example $C_2$-$C_4$) Y-grade mix, individual components extracted from natural gas streams such as ethane, propane, butane, or others, natural gas condensates ($C_{5+}$) or other similar gases or liquids (such as naphtha or condensate) that can be easily vaporized into a gas. Table 1 indicates the most likely commercial inputs into this embodiment of the invention. The system removes contaminants 104 and moves the gas into a mixing chamber 110 which may be heated. The chamber blends input gases along with side products of the process including a controlled amount of tailgas 149 and a mixture of water and alcohols (generally in the $C_1$-$C_6$ range) 121. These $C_1$-$C_6$ alcohols are examples of hydrocarbon alcohols.

A first centerpiece of the preferred embodiment is the syngas generator with a ceramic membrane 113. This syngas generator uses ceramic membranes consisting of one or more of the following: zirconia, perovskite, lanthanum strontium cobaltite, lanthanum strontium ferrite and/or other similar materials.

The syngas generator takes the heated and mixed output from the mixing chamber and adds oxygen ions separated from the air directly into the gaseous stream. The syngas generator is separately detailed in FIG. 2. Inputs to the generator may be adjusted throughout the embodiment (143 and 152) to create a syngas stream with an $H_2/CO$ ratio that is in the preferred 1.8-2.4 ratio. The system tests the output with multiple analyzers (122 and 140), making adjustments automatically. Some tailgas 146 may be added to the syngas immediately before the syngas is compressed, based on the output of the analyzers. The system then compresses 119 the resulting optimum mixture.

A second centerpiece of the embodiment is the direct liquid fuel production reactor 125. A preferred embodiment of the liquid fuel reactor is a multi-tubular catalytic reactor or any other type of heat exchanging reactor that can efficiently extract heat from the reaction zone. This embodiment's reactor utilizes a unique catalyst that contains from about 2 to about 50 parts-by-weight of transition metals such as cobalt, iron, nickel, or manganese and from about 0.1 to about 20 parts-by-weight of at least one metal selected from a group consisting of cerium, ruthenium, lanthanum, platinum, rhodium, gold, silver, or rhenium per 100 parts-by-weight coated on a lobed support selected from a group consisting of silica, alumina, carbon nanotubes, and/or combinations thereof. The multi-tubular reactor is operated at temperatures in the range of about 380 to 435° F., and pressures in the range of about 250 to 450 psig.

In a preferred embodiment, the reactor produces products (primarily consisting of $C_1$-$C_{35}$ hydrocarbons and oxygenated hydrocarbons) and water 128, which are separated and collected into three fractions using a two-stage condenser system 131. The first condenser is used to collect the small quantity of wax (primarily consisting of $C_{24}$-$C_{35}$) 137 that is formed from the catalyst. One embodiment of the invention will produce less than 10% wax by weight of its total product output; a preferred embodiment will produce less than 5% wax. The second condenser is used to collect the liquid fuel (primarily consisting of $C_5$-$C_{26}$ hydrocarbons and oxygenated hydrocarbons) and water 158. The remaining gas-phase fraction is the tailgas and consists primarily of $C_1$-$C_4$ hydrocarbons and oxygenated hydrocarbons, $CO_2$, and unreacted $H_2$ and CO. The collected liquid products are transferred to the separator vessel 158, wherein the top fraction contains liquid hydrocarbons and oxygenated hydrocarbons, and the bottom fraction comprises water.

In some embodiments of the invention, the tailgas is recycled to the mixing chamber 149 and directly into the syngas 146 in order to achieve the preferred $H_2/CO$ ratio of 1.8 to 2.4. The system achieves this with two online analyzers (122 and 140) that input two flow split controls (143 and 152). In addition or alternatively, tailgas collected after condensation may be used as a power or heat source 155 for the system or for external uses (e.g., heating associated buildings).

The system produces liquid fuels which are comprised of $C_5$-$C_{26}$ hydrocarbons and oxygenated hydrocarbons 161. The system then distills 164 the fuels into two primary products: reformulated gasoline blendstocks (approximately $C_5$-$C_8$ hydrocarbons & oxygenated hydrocarbons) 167 and diesel fuels (approximately $C_8$-$C_{26}$ hydrocarbons and oxygenated hydrocarbons) 170. A preferred embodiment of the invention will also produce less than 1% by volume of wax 173. Alternative or additional processes may be used to further distill the gasoline blendstocks and/or the diesel fuel into high value alpha-olefins and hydroxy-alkanes 176. In addition, the diesels fuels 170 may be further distilled into #1 diesel products, #2 diesel products, and/or #3 diesel products.

Alternative embodiments produce different intermediary products. The syngas generator may be integrated with other catalytic syngas conversion processes to produce carbonaceous intermediate feedstocks that can be transported to a refinery and/or chemical processing plant.

In another embodiment, Fischer-Tropsch (F-T) catalysts may be used in any type of catalytic reactor with the integrated syngas generation to produce intermediate hydrocarbon wax feedstocks that can be transported to a refinery and/or chemical processing plant for processing into fuels and/or chemicals.

In another embodiment, catalysts for the production of alcohols may be used in the catalytic reactor to produce intermediate mixed alcohols that can be transported to a refinery and/or chemical plant for processing into fuels and/or chemicals.

In yet another embodiment, catalysts for the production of methanol may be used in the catalytic reactor integrated with the syngas generation/ceramic membrane system to produce an intermediate methanol feedstock that can be transported to a refinery and/or chemical plant for processing into fuels and/or chemicals.

Figure 2:
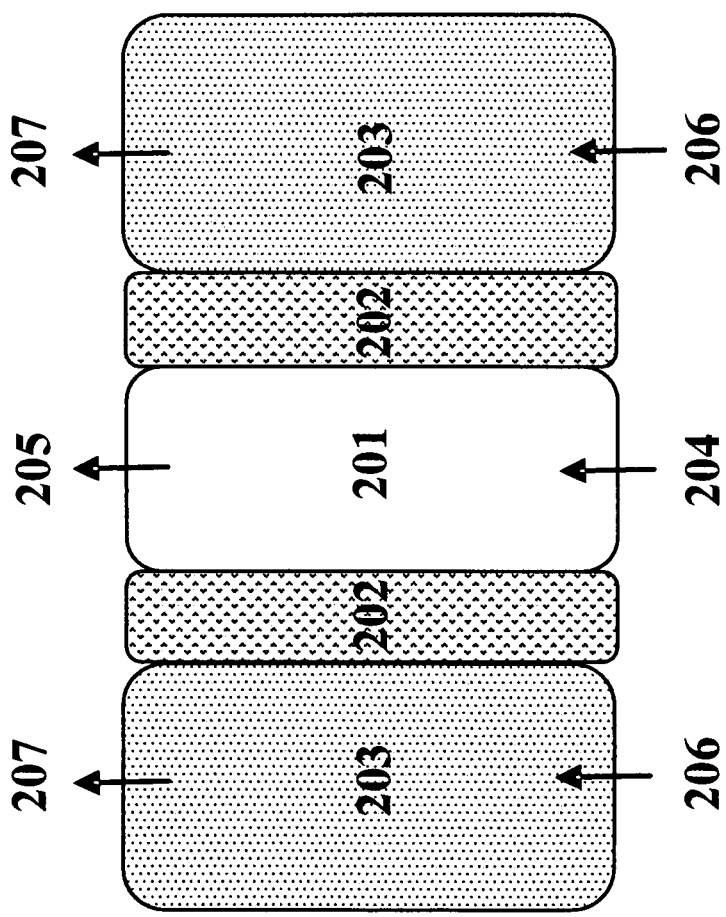
FIG. 2 illustrates a compact syngas generator in which a ceramic type membrane is used to separate oxygen from ambient air and form oxygen ions. The oxygen is transported into the membrane, converted to oxygen anions and then into a separate reaction zone in which syngas is produced from gaseous hydrocarbons.

The embodiments utilize a syngas generator with a ceramic membrane as illustrated in FIG. 2. One side of the membrane also acts as a reaction chamber for the creation of syngas 207. The central tube, plate, or other ceramic element 201 in the generator takes in ambient air or other mixed oxygen containing gases 204. The ceramic membrane 202 directly separates oxygen from ambient air at low pressures of about 5-15 psig and temperatures of about 1,550-1,900° F. The separated oxygen is converted to oxygen anions ($O^{2-}$) on the membrane surface and in the membrane, transferred through the membrane. These oxygen anions have a high conductivity through the membrane by means of a chemical potential gradient at the opposite surface of the membrane. At the opposite surface of the membrane, the $O^{2-}$ partially oxidizes the mixture of gaseous hydrocarbons, optionally with the presence of $CO_2$, and steam to form the syngas. The equation below illustrates the reaction of these oxygen anions with methane.

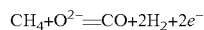
$$CH_4+O^{2-}=CO+2H_2+2e^-$$

The elections produced from this reaction convert the molecular oxygen the oxygen anions (½ $O_2+2e^-=O^{2-}$) in the membrane.

Since nitrogen, argon and other ambient air constituents do not transfer through the membrane and are output as waste 205; nearly pure oxygen is transferred through the membrane (>99.5 volume % purity) which is used for conversion by the gaseous hydrocarbon reforming catalysts 203 in reaction with the gaseous hydrocarbons, water and/or tailgas inputs 206. Syngas is produced 207 and, in some embodiments, may be tailored to produce an optimum $H_2$/CO ratio.

This process eliminates the need for any oxygen generating equipment, defined as co-located cryogenic oxygen production plants, pressure swing absorption (PSA) methods, vacuum pressure swing absorption (VPSA) methods, and other oxygen generation technologies that require compression to compress the oxygen to the operating pressure of the syngas generation reactor.

The oxygen permeable membranes 202 consist typically of ceramic materials such as porous alumina, nano-structured carbides, zirconia, perovskite, lanthanum strontium cobaltite, lanthanum strontium ferrite and/or other similar materials.

The surfaces of these membranes are coated with a dense thin film of a catalyst, such as $La_{0.5}Sr_{0.5}Fe_{0.8}Ga_{0.2}O_3$ and/or other catalytic materials which are inorganic compounds, each compound being comprised of two or more elements selected from period 4 of the periodic table, oxygen, strontium, aluminum and gallium. These membranes may be formed into tubes, plates and other appropriate configurations.

The membranes conduct oxygen ions at operating temperatures in the range of about 1,550-1,900° F. The oxygen permeable membranes consist generally of mixed ionic and electronic conductors which can conduct oxygen ions and electrons, simultaneously. For this material, there is no necessity for applying voltage for oxygen transfer, since the oxygen potential gradient can be the driving force of the transportation of oxygen. That is to say, the oxygen permeable ceramics are considered to be an intelligent material by which oxygen required for the gaseous hydrocarbon and $CO_2$ conversion can be automatically supplied as pure oxygen by using the oxygen potential gradient produced by the oxygen anions in the ceramic membrane.

The syngas generation system directly utilizes the oxygen, produced from the ceramic membrane, as an oxidant that reacts in a partial oxidation mode with the gas-phase hydrocarbons (HCs) and steam to convert the hydrocarbons to syngas with very high efficiencies, in some cases higher than 97% and in some preferred cases greater than 99%. Since $C_2$+ hydrocarbons and oxygenated hydrocarbons, such as hydroxy-alkanes, are easier to oxidize than methane, they are converted to syngas with even higher efficiencies. The syngas is produced at pressures ranging from ambient to about 600 psig 207.

In the some embodiments, in order to prevent coking and other undesirable reactions in the catalytic reformer 203, it is essential that the gaseous hydrocarbons are mixed with steam 107 and $CO_2$ from the tail-gas 149 in the heated mixing chamber 110, before being introduced into the syngas generator 113 to prevent coking and other undesirable reactions in the catalytic reformer.

In another embodiment, the present invention is directed to an integrated system for the production of liquid hydrocarbons from gaseous hydrocarbon sources. The system at least includes the following: a means for removing contaminants from a gas stream, wherein the gas stream comprises at least five percent by volume of hydrocarbons; a syngas generator wherein the syngas generator includes means to separate oxygen from air to provide purified oxygen which react with the gas stream introduced from the chamber to provide syngas; a catalytic reactor operably connected to the generator, wherein the catalytic reactor includes means for conversion of the syngas introduced from the generator into liquid fuels.

In certain cases with respect to an integrated system for the production of liquid hydrocarbons from gaseous hydrocarbon sources, the system does not include an apparatus for wax hydro-processing to produce the liquid fuels.

In certain cases with respect to an integrated system for the production of liquid hydrocarbons from gaseous hydrocarbon sources, the system does not include an apparatus for cryogenic oxygen production.

In certain cases with respect to an integrated system for the production of liquid hydrocarbons from gaseous hydrocarbon sources, the system does not include an apparatus for purifying oxygen by pressure swing absorption.

In certain cases with respect to an integrated system for the production of liquid hydrocarbons from gaseous hydrocarbon sources, the system does not include an apparatus for purifying oxygen by vacuum pressure swing absorption.

In certain cases with respect to an integrated system for the production of liquid hydrocarbons from gaseous hydrocarbon sources, the means to purify oxygen from air to provide purified oxygen is capable of providing oxygen at a purity level greater than about 95 percent.

In certain cases with respect to an integrated system for the production of liquid hydrocarbons from gaseous hydrocarbon sources, the integrated system further comprises means for introducing tail gas produced from the catalytic reactor into the syngas generator.

In certain cases with respect to an integrated system for the production of liquid hydrocarbons from gaseous hydrocarbon sources, the means to purify oxygen from air comprises a ceramic membrane.

In certain cases with respect to an integrated system for the production of liquid hydrocarbons from gaseous hydrocarbon sources, the catalytic reactor uses a catalyst, and wherein the catalyst comprises from about 2 to about 50 parts-by-weight of one or more transition metals per 100 parts per weight.

In certain cases with respect to an integrated system for the production of liquid hydrocarbons from gaseous hydrocarbon sources, the ceramic membrane comprises one or more of the following: zirconia, perovskite, lanthanum strontium cobaltite, lanthanum strontium ferrite.

In certain cases with respect to an integrated system for the production of liquid hydrocarbons from gaseous hydrocarbon sources, the catalyst further comprises from about 0.1 to about 5 parts-by-weight of at least one metal selected from a group consisting of cerium, ruthenium, lanthanum, platinum, palladium, gold, silver, or rhenium per 100 parts-by-weight.

In certain cases with respect to an integrated system for the production of liquid hydrocarbons from gaseous hydrocarbon sources, the surface of the ceramic membrane is covered with a thin film of a catalytic material, and wherein the catalytic materials are inorganic compounds comprised of two or more elements selected from Period 4 of the periodic table, oxygen, strontium and aluminum.

In certain cases with respect to an integrated system for the production of liquid hydrocarbons from gaseous hydrocarbon sources, the catalyst is coated on a support selected from a group of supports consisting of one or more inorganic compounds comprised of silica, alumina, and carbon nanotubes.

In another embodiment, the present invention is directed to a method for producing liquid hydrocarbons from gaseous hydrocarbon sources. The method includes at least the following steps: removing contaminants from a gas stream to provide a purified gas stream, wherein the gas stream comprises at least five percent by volume of hydrocarbons; heating the purified gas stream to provide heated gas; purifying oxygen from air to provide purified oxygen which is converted to oxygen anions and reacting the oxygen anions with the heated gas to provide syngas, wherein the purified oxygen is not provided by a process comprising cryogenic oxygen production, pressure swing absorption, or vacuum pressure swing absorption; and converting the syngas into liquid fuels.

In certain cases with respect to the method for producing liquid hydrocarbons from gaseous hydrocarbon sources, the purified oxygen is separated from air using a ceramic membrane. It is then converted to oxygen anions on one surface of the membrane, which are then transferred through the membrane, and used to produce syngas from hydrocarbons, oxygenated hydrocarbons and carbon dioxide on the opposite side of the membrane.

In certain cases with respect to the method for producing liquid hydrocarbons from gaseous hydrocarbon sources, the purified gas stream is mixed with tail gas from a catalytic reactor.

In certain cases with respect to the method for producing liquid hydrocarbons from gaseous hydrocarbon sources, the syngas has a stoichiometric $H_2/CO$ ratio of about 1.8-2.4/1.0.

In certain cases with respect to the method for producing liquid hydrocarbons from gaseous hydrocarbon sources, the purified gas stream is mixed with water and hydrocarbon alcohols from a catalytic reactor.

In certain cases with respect to the method for producing liquid hydrocarbons from gaseous hydrocarbon sources, the purified oxygen has a purity level greater than about 95 volume percent.

In certain cases with respect to the method for producing liquid hydrocarbons from gaseous hydrocarbon sources, the gas stream comprises at least five percent by volume of hydrocarbons.

In certain cases with respect to the method for producing liquid hydrocarbons from gaseous hydrocarbon sources, the gas stream comprises at least 0.5 percent by volume of carbon dioxide.

In certain cases with respect to the method for producing liquid hydrocarbons from gaseous hydrocarbon sources, the ceramic membrane comprises one or more of the following inorganic materials: zirconia, perovskite, lanthanum strontium cobaltite, and lanthanum strontium ferrite.

In certain cases with respect to the method for producing liquid hydrocarbons from gaseous hydrocarbon sources, the tail gas from the catalytic reactor comprises at least twenty volume percent methane.

In certain cases with respect to the method for producing liquid hydrocarbons from gaseous hydrocarbon sources, the concentration of hydrocarbon alcohols in water from the catalytic reactor are at least 0.5 percent by volume.

In certain cases with respect to the method for producing liquid hydrocarbons from gaseous hydrocarbon sources, the purified oxygen and oxygen anions have a purity level greater than about 99 volume percent.

In certain cases with respect to the method for producing liquid hydrocarbons from gaseous hydrocarbon sources, the surface of the ceramic membrane is covered with a thin film of a catalytic material, and wherein the catalytic materials are inorganic compounds comprised of one or more elements selected from a group of elements selected from period 4 of the periodic table, oxygen, strontium and gallium.

In certain cases with respect to the method for producing liquid hydrocarbons from gaseous hydrocarbon sources, converting the syngas into liquid fuels comprises conversion with a catalytic reactor.

In certain cases with respect to the method for producing liquid hydrocarbons from gaseous hydrocarbon sources, the system does not include an apparatus for wax hydro-processing to produce the liquid fuels.

In certain cases with respect to the method for producing liquid hydrocarbons from gaseous hydrocarbon sources, the catalytic reactor uses a catalyst, and the catalyst comprises from about 2 to about 50 parts-by-weight of one or more transition metals per 100 parts per weight.

In certain cases with respect to the method for producing liquid hydrocarbons from gaseous hydrocarbon sources, the catalyst further comprises from about 0.1 to about 5 parts-by-weight of at least one metal selected from a group consisting of cerium, ruthenium, lanthanum, platinum, palladium, gold, silver, or rhenium per 100 parts-by-weight.

In certain cases with respect to the method for producing liquid hydrocarbons from gaseous hydrocarbon sources, the purified gas stream is mixed with tail gas from the catalytic reactor, and wherein the tail gas comprises at least twenty percent methane.

In another embodiment, the present invention is directed to a method of running a plant for production of liquid hydrocarbons from gaseous hydrocarbon sources. The running of the plant is profitable and includes at least the following steps: removing contaminants from a gas stream to provide a purified gas stream, wherein the gas stream comprises at least five percent by volume of hydrocarbons; heating the purified gas stream; separating oxygen from air and converting that oxygen to oxygen anions using a ceramic membrane in a syngas generator, transferring those oxygen anions to the opposite side of the ceramic membrane, and reacting the oxygen anions with the heated hydrocarbon gas to provide syngas, wherein the purified oxygen anions are not provided by a process comprising cryogenic oxygen production, pressure swing absorption, or vacuum pressure swing absorption; converting the syngas into liquid fuels, wherein less than 10% wax by weight of total hydrocarbon product output is produced.

In certain cases with respect to the method of running a plant, oxygen is separated from air and converted to oxygen anions using a ceramic membrane. The oxygen anions are transferred through the ceramic membrane. The ceramic membrane comprises one or more of the following: zirconia, perovskite, lanthanum strontium cobaltite, lanthanum strontium ferrite, and the surface of the ceramic membrane is covered with a thin film of a catalytic material. The catalytic materials are inorganic compounds, each compound being comprised of two or more elements selected from period 4 of the periodic table, oxygen, strontium, aluminum and gallium.

In other cases with respect to the method of running a plant, the purified gas stream is mixed with tail gas, water and hydrocarbon alcohols from the catalytic reactor. The tail gas comprises at least twenty percent methane, and the concentration of hydrocarbon alcohols in water from the catalytic reactor are at least 0.5 percent by volume.

In other cases with respect to the method of running a plant, converting the syngas into liquid fuels comprises conversion with a multi-tubular catalytic reactor. The multi-tubular catalytic reactor comprises a catalyst, and the catalyst comprises from about 2 to about 50 parts-by-weight transition metals per 100 parts per weight. The catalyst further comprises from about 0.1 to about 5 parts-by-weight of at least one metal selected from a group consisting of cerium, ruthenium, lanthanum, platinum, palladium, gold, silver, or rhenium per 100 parts-by-weight.

In other cases with respect to the method of running a plant, less than 5%, 2.5% or 1.0% wax by weight of total hydrocarbon product output is produced.

In other cases with respect to the method of running a plant, the plant has a profit margin of at least 5%.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

EXAMPLES

Several examples of the embodiments are provided showing the relationship between the concentrations of the gaseous hydrocarbon resources, the recycled tail gas, water and carbon dioxide on the composition of the syngas.

Although the catalytic or thermal steam reforming of methane should ideally produce a $H_2/CO$ ratio of 3.0/1.0 according to the reaction in Eq. 1, additional $H_2$ is produced from some of the methane according to Eq. 2, resulting in the reaction stoichiometry given by Eq. 3.

$$CH_4 + H_2O = CO + 3H_2 \quad \text{Eq. 1}$$

$$CH_4 + 1.5H_2O = 0.5CO_2 + 0.5CO + 3.5H_2 \quad \text{Eq. 2}$$

$$2CH_4 + 2.5H_2O = 1.5CO + 0.5CO_2 + 6.5H_2 \quad \text{Eq. 3}$$

As a result, the ratio of $H_2/CO$ generated from a methane steam reformer is typically greater than 4.0 (Norbeck et al, 2008). The required ratio of $H_2O/CH_4$ needs to be at least 1.25 according to equation 3, but preferably 2.0-3.0 to eliminate the possibility of carbon formation.

Eq. 4 demonstrates the partial oxidation of methane, which also occurs in the syngas generator (with ceramic membrane), and when combined with Eq. 3 gives Eq. 5 as the average ratio of $H_2/CO$.

$$CH_4 + 0.5O_2 = CO + 2H_2 \quad \text{Eq. 4}$$

$$3CH_4 + 2.5H_2O + 0.5O_2 = 2.5CO + 0.5CO_2 + 8.5H_2 \quad \text{Eq. 5}$$

TABLE 2

A Comparison of the Product Stoichiometry from Reaction #5 with Data Obtained from Laboratory Experiments

| Reaction Product | Concentration (Volume %) (from Eq. 5) | Concentration (Volume %) (from lab data) |
|---|---|---|
| $H_2$ | 73 | 68 |
| CO | 22 | 21 |
| $CO_2$ | 5 | 11 |
| $CH_4$ | — | 0.2 |

Thus, the ratio of $H_2/CO$ from the syngas generator averages about 3.3 when the molar ratio of $O^{2-}/CH_4$ is about 0.17. The concentration of carbon dioxide in this example is about 5% by volume in the syngas. The stoichiometry of the products from equation #5 is reasonably consistent with laboratory data reported by Dyer et al (2000), as given in Table 2.

Table 3 summarizes a typical composition of tailgas that is generated from the catalytic reactor when the condenser 131 is operated in the range of 45-55° F.

TABLE 3

The Average Composition of Tailgas Output from the Catalytic Reactor Tail-gas Composition (Volume %)

| $CH_4$ | $CO_2$ | $C_2H_6$ | $C_3H_8$— $C_4H_{10}$ | $H_2$ | CO | Total |
|---|---|---|---|---|---|---|
| 39 | 31 | 7 | 5 | 11 | 7 | 100 |

The tailgas contains $CH_4$ that is primarily produced from the catalytic reaction of the syngas to produce fuel. Since the catalyst produces very little $CO_2$, the $CO_2$ that is present in the tailgas originates primarily from the gaseous hydrocarbon resource and syngas generator. Small quantities of $C_2$-$C_4$ hydrocarbons are generated from the catalytic reaction and since they have a high vapor pressure they are not condensed as liquid fuels. Some unreacted $H_2$ and CO is also present since the direct fuel production reactor is operated under conditions that convert 90-95% of the CO to products.

In some cases, the gaseous hydrocarbon resource may already contain $CO_2$ as presented in Table 1. Since the syngas generator also converts some of the $CO_2$ into syngas, the concentration of $CO_2$ in the catalyst tail-gas should not increase above about 31% as specified in Table 3.

When $CO_2$ is added to the syngas generator, tri-reforming occurs which produces $H_2$/CO in various ratios, depending upon the ratio of $CO_2/CH_4$ in the generator as shown in Table 4.

Sample #1 in Table 4 demonstrates the steam reforming of $CH_4$ with $H_2O$ (at 1.5/1.0 molar ratio), when the input air stream in the syngas generator is turned off to eliminate the production of $O^{2-}$. In this example, the syngas generator produces an $H_2$/CO ratio of about 4.00.

TABLE 4

The Effect of Various Molar Ratios of $CO_2/CH_4$ on the Molar Ratios of $H_2$/CO Produced from the Syngas Generator

| Sample | Molar Ratios of Reactants | | | | $H_2$/CO Molar |
|---|---|---|---|---|---|
| # | $CH_4$ | $CO_2$ | $H_2O$ | $O^{2-}$ | Product Ratio |
| 1 | 1.00 | 0.00 | 1.50 | 0.00 | 4.00 |
| 2 | 1.00 | 0.00 | 1.50 | 0.20 | 3.30 |
| 3 | 1.00 | 0.25 | 1.50 | 0.20 | 2.60 |
| 4 | 1.00 | 0.40 | 1.50 | 0.20 | 2.36 |
| 5 | 1.00 | 0.50 | 1.50 | 0.20 | 2.20 |
| 7 | 1.00 | 0.62 | 1.50 | 0.20 | 1.95 |
| 8 | 1.00 | 0.75 | 1.50 | 0.20 | 1.80 |
| 9 | 1.00 | 0.90 | 1.50 | 0.20 | 1.56 |

In sample #2 (Table 4), when the oxygen transfer membrane is operating, the $O^{2-}$ level in the syngas generator is at about 0.20 volume %. Under these conditions the syngas generator produces an $H_2$/CO product ratio of about 3.30. This ratio is consistent with the stoichiometry of 3.30 given by equation #5.

In sample #3 (Table 4), when $CO_2$ in the tail-gas is added to provide a $CO_2/CH_4$ ratio of 0.25, the ratio of $H_2$/CO generated by the syngas generator will be about 2.60. As shown by samples #5 and #6, the $H_2$/CO product ratio is within the ideal range (1.95-2.20) when the $CO_2/CH_4$ ratios are within the range of about 0.50-0.62.

In cases when there is not enough $CO_2$ available in the tailgas and the gaseous hydrocarbon resource to provide $CO_2/CH_4$ in the range of about 0.50-0.62, the $C_2$-$C_4$ hydrocarbons in the tailgas (see Table 3) are used to help adjust the $H_2$/CO to the proper range.

Therefore, the next example demonstrates the effect of adding ethane at various levels to the syngas generator. The catalytic or thermal steam reforming of ethane ($C_2H_6$) produces a lower $H_2$/CO ratio of 2.5/1.0 according to equation #6.

$$C_2H_6 + 2H_2O = 2CO + 5H_2 \qquad \text{Eq. 6}$$

Equation #7, which is the partial oxidation of ethane, also occurs in the syngas generator with ceramic membrane, and therefore the average ratio of $H_2$/CO for this process is 1.5. The combination of equations #6 and #7 is given by equation #8 that generates an average ratio of $H_2$/CO of 2.0.

$$C_2H_6 + O^{2-} = 2CO + 3H_2 \qquad \text{Eq. 7}$$

$$2C_2H_6 + 2H_2O + O^{2-} = 4CO + 8H_2 \qquad \text{Eq. 8}$$

Table 5 summarizes the effect of various $C_2H_6/CH_4$ ratios on the ratios of $H_2$/CO generated from the syngas generator with ceramic membrane.

Sample #1 in Table 5 demonstrates the steam reforming of $C_2H_6$ with $H_2O$ (at 1.0/1.0 molar ratio) when the input air stream in the syngas generator is turned off to eliminate the production of $O^{2-}$. In this example, the Syngas Generator produces an $H_2$/CO ratio of 3.90.

In sample #2 (Table 5), when the oxygen transfer membrane is turned on in the syngas generator, the $O^{2-}$ level is about 0.20 volume % in the reaction chamber. Under these conditions the syngas generator produces an $H_2$/CO product ratio of 3.00. This ratio is consistent with the stoichiometry of 3.00 that was specified by equation #5.

When the catalyst water product is recycled and the $C_2H_6/CH_4$ is about 0.25, the $H_2$/CO product ratio drops to 2.75. In the same manner as the ratio $C_2H_6/CH_4$ the $H_2$/CO ratio is further reduced. However, since there are not sufficient concentrations of these alcohols (e.g. hydroxyl-alkanes), the proper combination of catalyst water product and tail gas is needed to produce the desired $H_2$/CO ratios.

TABLE 5

The Effect of Various Molar Ratios of $C_2H_6/CH_4$ on $H_2$/CO Molar Ratios Produced from the Syngas Generator (with ceramic membrane)

| Sample | Molar Ratios of Reactants | | | | $H_2$/CO Molar |
|---|---|---|---|---|---|
| # | $CH_4$ | $C_2H_6$ | $H_2O$ | $O^{2-}$ | Product Ratio |
| 1 | 1.00 | 0.00 | 1.50 | 0.00 | 3.90 |
| 2 | 1.00 | 0.00 | 1.50 | 0.20 | 3.00 |
| 3 | 1.00 | 0.25 | 1.50 | 0.20 | 2.75 |
| 4 | 1.00 | 0.40 | 1.50 | 0.20 | 2.60 |
| 5 | 1.00 | 0.50 | 1.50 | 0.20 | 2.50 |
| 7 | 1.00 | 0.75 | 1.50 | 0.20 | 2.25 |
| 8 | 1.00 | 0.90 | 1.50 | 0.20 | 2.10 |
| 9 | 1.00 | 1.00 | 1.50 | 0.20 | 1.95 |

As a result of the above recycling processes, Table 6 summarizes a typical, desired composition of the syngas that is produced from the syngas generator during plant operation.

TABLE 6

The Composition of the Syngas after
Recycling of Side Products
Tailgas Composition (Volume %)

| CH$_4$ | N$_2$ | CO$_2$ | H$_2$ | CO | Total |
|---|---|---|---|---|---|
| 1 | 5 | 14 | 55 | 25 | 100 |

Table 7 summarizes the average, total yield (gallons) of fuel produced from 30,000 scf of methane converted to syngas with an average H$_2$/CO ratio of 2.25 using the processes described in this document. This volume of methane was chosen since it contains about 1,000 lbs. of carbon. Therefore, the average production of fuel produced from 1,000,000 scf/day of methane is approximately 4,629 gallons/1,000,000 scf or about 110 barrels/1,000,000 scf.

TABLE 7

The Total Yield (Gallons/30,000 scf) of
Fuel Products Produced from Methane

| Run # | Gallons/30,000 scf CH$_4$ |
|---|---|
| 8b | 138 |
| 16a | 140 |
| 17g | 133 |
| Average | 139 |

Table 8 provides some data on the concentration of alcohols in the water generated from the catalytic reaction. Since this water is recycled to the syngas generator, the alcohols will serve to reduce the H$_2$/CO ratio. Equation #9 illustrates the reaction products and resulting product stoichiometry from the reforming of methanol as an example.

$$CH_3OH + 2H_2O = CO + 2H_2 + 2H_2O \quad \text{Eq. 9}$$

$$CH_3OH + 1/2O^{2-} = CO + H_2 + H_2O \quad \text{Eq. 10}$$

$$2CH_3OH + 2H_2O + 1/2O^{2-} = 2CO + 3H_2 + 3H_2O \quad \text{Eq. 11}$$

TABLE 8

The Concentration of Alcohols (e.g. hydroxyl-
alkanes) in the Catalyst Water Stream Recycled
to the Ceramic Membrane/Syngas Generator

| Compound | Volume % in Water |
|---|---|
| Ethanol | 0.489 |
| Propanol | 0.197 |
| Butanol | 0.198 |
| Pentanol | 0.108 |
| Hexanol | 0.031 |
| Heptanol | 0.011 |
| Total | 1.043 |

In this case, the reforming of methanol (and the other alcohols) will produce a H$_2$/CO ratio of 1.5/1.0 that will help adjust the H$_2$/CO ratio of the syngas within the desired 1.8-2.4 range.

The invention claimed is:

1. A method for producing liquid hydrocarbons from gaseous hydrocarbon sources comprising:
   removing contaminants from a gas stream to provide a purified gas stream, wherein the gas stream comprises at least five percent by volume of hydrocarbons, and wherein the gas stream is mixed with a tail gas and a mixture of water and hydrocarbon alcohols from a catalytic reactor, wherein the tail gas comprises at least twenty percent methane and the concentration of hydrocarbon alcohols in the water is at least 0.5 percent by volume;
   heating the purified gas stream to provide heated gas;
   purifying oxygen from air to provide purified oxygen which is converted to oxygen anions and reacting the oxygen anions with the heated gas to provide syngas, wherein the purified oxygen is not provided by a process comprising cryogenic oxygen production, pressure swing absorption, or vacuum pressure swing absorption; and
   converting the syngas into liquid fuels comprising less than 2.5% wax, wherein converting the syngas into liquid fuels comprises conversion with a catalytic reactor system comprising the catalytic reactor, and wherein the system does not include an apparatus for wax hydro-processing to produce the liquid fuels, and wherein the catalytic reactor uses a catalyst, and wherein the catalyst comprises from about 2 to about 50 parts-by-weight of one or more transition metals per 100 parts per weight, and wherein the catalyst further comprises from about 0.1 to about 5 parts-by-weight of at least one metal selected from the group consisting of cerium, ruthenium, lanthanum, platinum, gold, and silver per 100 parts-by-weight, and wherein the catalytic reactor is operated at temperatures ranging from about 380° F. to about 435° F. and pressures ranging from about 250 psig to about 450 psig.

2. The method according to claim 1, wherein the purified oxygen is separated from air using a ceramic membrane and converted to oxygen anions on one surface of the membrane, which are then transferred through the membrane, and used to produce syngas from the heated gas on the opposite side of the membrane, wherein the heated gas further comprises carbon dioxide.

3. The method according to claim 1, wherein the syngas has a stoichiometric H$_2$/CO ratio of about 1.8-2.4/1.0.

4. The method according to claim 1, wherein the purified oxygen has a purity level greater than about 95 volume percent.

5. The method according to claim 2, wherein the ceramic membrane comprises one or more of the following inorganic materials: zirconia, perovskite, lanthanum strontium cobaltite, or lanthanum strontium ferrite.

6. The method according to claim 2, wherein the purified oxygen and oxygen anions have a purity level greater than about 99 volume percent.

7. The method according to claim 2, wherein the surface of the ceramic membrane is covered with a film of a catalytic material, and wherein the catalytic material is an inorganic compound selected from the group of elements consisting of oxygen, strontium, gallium, and mixtures thereof.

8. An integrated method for producing diesel fuels and reformulated gasoline blends from natural gas in the field, wherein the process uses a system comprising two unit operations and wherein the two unit operations are a syngas generator with an integrated ceramic membrane and a direct liquid fuel production reactor, wherein the method comprises the steps of:
   introducing the natural gas into the system and subsequently removing contaminants from a natural gas stream to provide a purified natural gas stream;
   introducing the purified natural gas into a mixing chamber of the system where it is mixed with a tail gas and a mixture of water and hydrocarbon alcohols from a catalytic reactor, wherein the tail gas comprises at least twenty percent methane and the concentration of hydrocarbon alcohols in the water is at least 0.5 percent by volume and heated to provide a mixed and heated output;

introducing the heated output into the syngas generator with an integrated ceramic membrane;

reacting oxygen anions with the mixed and heated output to produce syngas, wherein the oxygen anions are produced through interaction of ambient air with the ceramic membrane and transferred through the ceramic membrane into the syngas generator;

compressing the syngas and introducing it into the direct liquid fuel production reactor, wherein the direct liquid fuel production reactor comprises the catalytic reactor, and wherein the catalytic reactor comprises a catalyst, and wherein the catalyst comprises from about 2 to about 50 parts-by-weight of one or more transition metals per 100 parts per weight, and wherein the catalyst further comprises from about 0.1 to about 5 parts-by-weight of at least one metal selected from the group consisting of cerium, lanthanum, ruthenium, platinum, gold, and silver per 100 parts-by-weight, and wherein the catalytic reactor is operated at temperatures ranging from about 380° F. to about 435° F. and pressures ranging from about 250 psig to about 450 psig;

converting the syngas into liquid fuels through reaction with the catalyst, wherein the liquid fuels comprise of $C_1$-$C_{35}$ hydrocarbons and oxygenated hydrocarbons and less than 2.5 percent wax;

collecting the liquid fuels;

introducing the collected fuels into a part of the system that performs distillation;

distilling the collected fuels, thereby producing the diesel fuels and the reformulated gasoline blends, wherein the process does not include a wax hydroprocessing step.

9. The integrated method according to claim 8, wherein the ceramic membrane comprises one or more of the following: zirconia, perovskite, lanthanum strontium cobaltite or lanthanum strontium ferrite, and wherein the surface of the ceramic membrane is covered with a film of a catalytic material, and wherein the catalytic material is an inorganic compound, the compound comprising two or more elements selected from the group consisting of oxygen, strontium, aluminum, and gallium.

10. The integrated method according to claim 9, wherein the liquid fuels contain less than 1.0% wax.

11. The integrated method according to claim 10, wherein the diesel fuels and reformulated gasoline blends are produced with a profit margin of at least 5%.

* * * * *